(12) United States Patent
Dewachter et al.

(10) Patent No.: US 9,085,650 B2
(45) Date of Patent: Jul. 21, 2015

(54) METHOD FOR REPLACING INCOMPATIBLE ETHYLENE POLYMERIZATION CATALYSTS

(75) Inventors: Daan Dewachter, Mechelen (BE); Martine Slawinski, Nivelles (BE)

(73) Assignee: TOTAL RESEARCH & TECHNOLOGY FELUY, Seneffe (Feluy) (BE)

(*) Notice: Subject to any disclaimer, the term of this patent is extended or adjusted under 35 U.S.C. 154(b) by 425 days.

(21) Appl. No.: 13/514,349

(22) PCT Filed: Dec. 17, 2010

(86) PCT No.: PCT/EP2010/070027
§ 371 (c)(1),
(2), (4) Date: Jun. 7, 2012

(87) PCT Pub. No.: WO2011/073369
PCT Pub. Date: Jun. 23, 2011

(65) Prior Publication Data
US 2012/0309910 A1  Dec. 6, 2012

(30) Foreign Application Priority Data

Dec. 18, 2009  (EP) .................................... 09179870

(51) Int. Cl.
| C08F 2/42 | (2006.01) |
| C08F 2/12 | (2006.01) |
| C08F 2/00 | (2006.01) |
| C08F 10/02 | (2006.01) |
| B01J 4/00 | (2006.01) |
| C08F 110/02 | (2006.01) |

(52) U.S. Cl.
CPC ............... *C08F 10/02* (2013.01); *C08F 110/02* (2013.01); *C08F 2410/05* (2013.01)

(58) Field of Classification Search
USPC ........................................ 526/64, 86, 919, 84
See application file for complete search history.

(56) References Cited

U.S. PATENT DOCUMENTS

| 6,284,849 | B1 | 9/2001 | Almquist et al. | |
| 6,833,416 | B2* | 12/2004 | Kinnan et al. | 526/82 |
| 2003/0114608 | A1* | 6/2003 | Tharappel et al. | 526/64 |
| 2006/0160965 | A1 | 7/2006 | Goode et al. | |
| 2008/0039596 | A1 | 2/2008 | Fouarge | |
| 2008/0269435 | A1 | 10/2008 | Kallio et al. | |
| 2009/0143546 | A1 | 6/2009 | Fouarge et al. | |

FOREIGN PATENT DOCUMENTS

| EP | 1563902 A1 | 8/2005 |
| GB | 838395 A | 6/1960 |
| WO | 03/016362 A1 | 2/2003 |
| WO | 2004060938 A1 | 7/2004 |

OTHER PUBLICATIONS

Encyclopedia of Chemical Technology, 3rd Edition, vol. 16, pp. 385-401, 1981.
Communication of a Notice of Opposition issued in European Patent Application No. 10795345.7, dated Jan. 19, 2015 (6 pages).

* cited by examiner

*Primary Examiner* — Fred M Teskin (57) ABSTRACT

The present invention relates to a method for optimizing the sequential use of at least two ethylene polymerization catalysts to an ethylene polymerization loop reactor, comprising:

transferring to a mixing vessel a first ethylene polymerization catalyst and a first diluent, thereby providing a first catalyst slurry, transferring said first catalyst slurry from said mixing vessel to an ethylene polymerization loop reactor at a concentration suitable for polymerizing ethylene, increasing the ratio of said diluent to said first ethylene polymerization catalyst in said first catalyst slurry, stopping the supply of said first catalyst slurry to said mixing vessel, stopping the supply of said first catalyst slurry to said ethylene polymerization loop reactor, stopping the supply of ethylene to said ethylene polymerization loop reactor, removing said first catalyst slurry from said ethylene polymerization loop reactor, emptying said mixing vessel, optionally rinsing said mixing vessel with fresh diluent, transferring to said mixing vessel a second ethylene polymerization catalyst and a second diluent, thereby providing a second catalyst slurry, decreasing the ratio of said second diluent to said second ethylene polymerization catalyst in said mixing vessel to obtain a concentration of said second ethylene polymerization catalyst in said second diluent suitable for polymerizing ethylene, transferring said second ethylene polymerization catalyst slurry from said mixing vessel to said ethylene polymerization reactor, restoring the supply of ethylene to said ethylene polymerization loop reactor, restarting ethylene polymerization in said ethylene polymerization loop reactor.

16 Claims, 1 Drawing Sheet

METHOD FOR REPLACING INCOMPATIBLE ETHYLENE POLYMERIZATION CATALYSTS

CROSS-REFERENCE TO RELATED APPLICATIONS

This application claims the benefit of PCT/EP2010/070027, filed Dec. 17, 2010, which claims priority from EP 09179870.2, filed Dec. 18, 2009.

FIELD OF THE INVENTION

The present invention relates to a method for replacing an ethylene polymerization catalyst with another ethylene polymerization catalyst, whereby the second catalyst is incompatible with the first catalyst. This invention can advantageously be used in chemical manufacturing, specifically in the production of polyethylene.

BACKGROUND OF THE INVENTION

Polyethylene (PE) is synthesized by polymerizing ethylene ($CH_2=CH_2$) monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HOPE (High Density Polyethylene). Each type of polyethylene has different properties and characteristics.

Ethylene polymerizations are frequently carried out in a loop reactor using ethylene monomer, liquid diluent and catalyst, optionally one or more co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash vessel, where most of the diluent and unreacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed, the polymer product is dried, additives can be added and finally the polymer may be extruded and pelletized.

During the extrusion process ingredients including polymer product, optional additives, etc, are mixed intimately in order to obtain a compound as homogeneous as possible. Usually, this mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

Polymerization of ethylene involves the polymerization of ethylene monomer in the reactor in the presence of a polymerization catalyst and optionally, if required depending on the used catalyst, an activating agent. Suitable catalysts for the preparation of polyethylene, comprise chromium catalysts, Ziegler-Natta catalysts and metallocene catalysts. Typically, the catalyst is used in particulate form. The polyethylene is produced as a resin/powder with a hard catalyst particle at the core of each grain of the powder.

Several systems have been disclosed which involve the preparation and the supply of catalyst slurry to a polymerization reaction. In general, for preparing catalyst slurry, a mixture of dry solid particulate catalyst and diluent are apportioned in a catalyst mixing vessel and thoroughly mixed. Then such catalyst slurry is typically transferred to a polymerization reactor for contact with the monomer reactants, generally under high pressure conditions.

It is known in the art that for the production of ethylene polymers having suitable properties it is important to adequately transition between production campaigns using different polymerization catalysts. Inadequate changing from a first to a second catalyst may result in disturbances of a polymerization reactor's steady state regime, long transition periods, production of transition material unsuitable for further use, for instance in an application. This transitioning is especially tricky and time consuming if the catalysts involved are incompatible.

In view of the above, there remains a need in the art for optimizing the sequential feeding of at least two incompatible ethylene polymerization catalysts to an ethylene polymerization reactor. The present invention aims to provide a method allowing that a catalyst transitioning process involving incompatible catalysts can be improved further.

SUMMARY OF THE INVENTION

The present invention relates to a method for optimizing the sequential feeding of at least two incompatible ethylene polymerization catalysts to an ethylene polymerization reactor, as provided by claim 1.

Specifically, the present invention provides a method for optimizing the sequential use of at least two ethylene polymerization catalysts to an ethylene polymerization loop reactor, comprising:
- transferring to a mixing vessel a first ethylene polymerization catalyst and a first diluent, thereby providing a first catalyst slurry,
- transferring said first catalyst slurry from said mixing vessel to an ethylene polymerization loop reactor at a concentration suitable for polymerizing ethylene,
- increasing the ratio of said diluent to said first ethylene polymerization catalyst in said first catalyst slurry,
- stopping the supply of said first catalyst slurry to said mixing vessel,
- stopping the supply of said first catalyst slurry to said ethylene polymerization loop reactor,
- stopping the supply of ethylene to said ethylene polymerization loop reactor, (preferably simultaneously to the stopping of the supply of the first catalyst to said mixing vessel),
- removing said first catalyst slurry from said ethylene polymerization loop reactor,
- emptying said mixing vessel,
- optionally rinsing said mixing vessel with fresh diluent, transferring to said mixing vessel a second ethylene polymerization catalyst and a second diluent, thereby providing a second catalyst slurry, decreasing the ratio of said second diluent to said second ethylene polymerization catalyst in said mixing vessel to obtain a concentration of said second ethylene polymerization catalyst in said second diluent suitable for polymerizing ethylene, transferring said second ethylene polymerization catalyst slurry from said mixing vessel to said ethylene polymerization reactor, restoring the supply of ethylene to said ethylene polymerization loop reactor, restarting ethylene polymerization in said ethylene polymerization loop reactor.

The above provided method allows transitioning from one type of catalyst to another in the production of ethylene polymer in a commercial reactor. Hence polymers having different properties and characteristics as obtained using another catalyst system may be produced in the same equipment.

In a second aspect, the invention provides for a use in an ethylene polymerization reactor plant of a method according to the invention for the sequential use of at least two ethylene polymerization catalysts.

The present invention reduces complications usually encountered when catalysts of different types and/or incompatible catalysts are used. For example, to change from a traditional chromium-based catalyst to a metallocene catalyst, or vice versa, normally requires a long transition period. Moreover, the polyethylene produced during this transition period will continuously change in properties. If the transition from one catalyst system to another requires substantial changes in reactor conditions, the risks of encountering production problems and producing polymers having extreme properties are likely.

Optimization of the catalyst feed to an ethylene polymerization reactor allows the transition time to be kept to a minimum. This is advantageous for reducing the amount of transition product produced. As the transition product is waste material, it is of economical interest to keep it to a minimum, even to avoid it.

These and further aspects and embodiments of the invention are further explained in the following sections and in the claims, as well as illustrated by non-limiting examples.

DETAILED DESCRIPTION OF THE INVENTION

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The terms "comprising", "comprises" and "comprised of" also include the term "consisting of".

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to a novel method for optimizing the sequential feeding of at least two incompatible ethylene polymerization catalysts to an ethylene polymerization reactor.

As used herein, the "sequential feeding" refers to a feeding sequence of catalysts, whereby a second catalyst is fed to an ethylene polymerization reactor following a first catalyst. As the second catalyst is incompatible with the first catalyst used in the polymerization reactor, the ethylene polymerization reaction is first killed and the reactor purged, before restarting the reaction again including the feeding of the second catalyst to the ethylene polymerization reactor.

As used herein, the "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as "ethylene polymerization catalysts".

By the term "incompatible catalysts" it is meant, catalysts having different performances towards molecular weight regulators, such as hydrogen and co-monomers. Use of incompatible catalysts in an ethylene polymerization reaction not adjusted to a change in catalyst results in different co-monomer incorporation. Their reactivity ratios may differ by more than 30%. Polymers may be produced that differ in molecular weight by a factor of at least two. These differences would result in a blend of polyethylenes that are incompatible. Blending of two incompatible polymer grades made with incompatible catalysts under the same reaction conditions will generate gels.

Examples of incompatible catalyst pairs are metallocene catalysts with chromium catalysts and metallocene with Ziegler-Natta catalysts. An example of incompatible metallocene type catalysts are Et(THI)$_2$ZrCl$_2$ (dimethylmethylene [1-(4-tert-butyl-2-methyl-cyclopentadienyl)](3,6-ditert-butyl-fluoren-9-yl)zirconium dichloride). Another example is Et(THI)$_2$ZrCl$_2$ (dimethylsilylene bis(2-methyl-4-phenyl-inden-1-yl)zirconium dichloride).

The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerization of olefins has various advantages. Metallocene catalysts have high activities and are capable of preparing polymers with enhanced physical properties in comparison with the polymers prepared using Ziegler-Natta catalysts. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

$$(Ar)_2MQ_2 \quad \quad \quad \text{(I); or}$$

$$R''(Ar)_2MQ_2 \quad \quad \quad \text{(II)}$$

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl (Cp), indenyl (IND), tetrahydroindenyl (THI) or fluorenyl, wherein each of said groups may be optionally substituted with one or more substituents each independently selected from the group consisting of halogen, a hydrosilyl, a SiR$_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P;
wherein M is a transition metal selected from the group consisting of titanium, zirconium, hafnium and vanadium; and preferably is zirconium;
wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and
wherein R" is a divalent group or moiety bridging the two Ar groups and selected from the group consisting of a C$_1$-C$_{20}$ alkylene, a germanium, a silicon, a siloxane, an alkylphosphine and an amine, and wherein said R" is optionally substituted with one or more substituents each independently selected from the group consisting of halogen, a hydrosilyl, a SiR$_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched C$_1$-C$_{20}$ alkyl; C$_3$-C$_{20}$ cycloalkyl; C$_6$-C$_{20}$ aryl; C$_7$-C$_{20}$ alkylaryl and C$_7$-C$_{20}$ arylalkyl, or any combinations thereof. Exemplary hydrocarbyl groups are methyl, ethyl, propyl, butyl (Bu), amyl, isoamyl, hexyl, isobutyl, heptyl, octyl, nonyl, decyl, cetyl, 2-ethyl-hexyl, and phenyl. Exemplary halogen atoms include chlorine, bromine, fluorine and iodine and of these halogen atoms, fluorine and chlorine are preferred. Exemplary hydrocarboxy groups are methoxy, ethoxy, propoxy, butoxy, and amyloxy. Exemplary of the alkylene groups is methylidene, ethylidene and propylidene.

Illustrative examples of metallocene catalysts comprise but are not limited to bis(cyclopentadienyl) zirconium dichloride (Cp$_2$ZrCl$_2$), bis(cyclopentadienyl)titanium dichloride (Cp$_2$TiCl$_2$), bis(cyclopentadienyl)hafnium dichloride (Cp$_2$HfCl$_2$); bis(tetrahydroindenyl)zirconium dichloride, bis (indenyl)zirconium dichloride, and bis(n-butyl-cyclopentadienyl)zirconium dichloride; ethylenebis(4,5,6,7-tetrahydro-1-indenyl)zirconium dichloride, ethylenebis(1-indenyl) zirconium dichloride, dimethylsilylene bis(2-methyl-4-phenyl-inden-1-yl)zirconium dichloride, diphenylmethylene (cyclopentadienyl)(fluoren-9-yl)zirconium dichloride, and dimethylmethylene[1-(4-tert-butyl-2-methyl-cyclopentadienyl)](fluoren-9-yl)zirconium dichloride.

Generally, metallocene catalysts are provided on a solid support. The support should be an inert solid, which is chemically unreactive with any of the components of the conventional metallocene catalyst. The support is preferably a silica compound. In a preferred embodiment, the metallocene catalyst is provided on a solid support, preferably a silica support.

The term "chromium catalysts" refers to catalysts obtained by deposition of chromium oxide on a support, e.g. silica or aluminium support. Illustrative examples of chromium catalysts comprise but are not limited to CrSiO$_2$ or CrAl2O$_3$.

The term "Ziegler-Natta catalysts" refers to catalysts preferably of the general formula MX$_n$, wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to TiCl$_3$, TiCl$_4$.

By the term "ethylene polymerization" it is meant feeding to a reactor reactants including ethylene monomer, a diluent, a catalyst and optionally a co-monomer, an activating agent and a terminating agent such as hydrogen. A homo-polymer or co-polymer result. The term "co-polymer" refers to a polymer, which is made by linking two different types of in the same polymer chain. The term "homopolymer" refers to a polymer which is made by linking ethylene monomers, in the absence of co-monomers.

As used herein, the term "diluent" refers to diluents in liquid form that is in a liquid state, liquid at room temperature. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, the diluent is isobutane. However, it should be clear from the present invention that other diluents may as well be applied according to the present invention.

The term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene.

The term "activating agent" refers to materials that can be used in conjunction with a catalyst in order to improve the activity of the catalyst during the polymerization reaction. In the present invention, it particularly refers to an organoaluminium compound, being optionally halogenated, having general formula $AlR^1R^2R^3$ or $AlR^1R^2Y$, wherein $R^1$, $R^2$, $R^3$ is an alkyl having from 1 to 6 carbon atoms and $R^1$, $R^2$, $R^3$ may be the same or different and wherein Y is hydrogen or a halogen.

In a first aspect, the invention provides a method for optimizing the sequential use of at least two ethylene polymerization catalysts to an ethylene polymerization loop reactor.

In an embodiment, a method of the invention comprises: transferring to a mixing vessel a first ethylene polymerization catalyst and a first diluent, thereby providing a first catalyst slurry. In case the catalyst slurry and ethylene polymerization catalyst are added to the mixing vessel separately, the catalyst slurry is formed in the mixing vessel. In case the catalyst is transferred to the mixing vessel by means of a conduit to which diluent is added prior to reaching the mixing vessel, the slurry is formed on transport of the first ethylene polymerization catalyst to the mixing vessel.

Preferably, a catalyst slurry comprising an ethylene polymerization catalyst diluted in a diluent has a concentration, expressed as catalyst weight by weight of diluent, of between 0.1% and 10% by weight. More preferably the slurry is diluted in a hydrocarbon diluent to a concentration comprised between 0.1% and 4% by weight, more preferred between 0.1 and 1%, and even more preferred of 0.5% by weight.

The first ethylene polymerization catalyst can be a Ziegler-Natta catalyst, a chromium catalyst or a metallocene catalyst. The diluent is preferably a hydrocarbon diluent, more preferably isobutane.

Use of a mixing vessel allows in-line dilution of a first catalyst slurry to be prepared and high concentration storage in the mud pot. Preferably a mixing vessel has a capacity of 500 l of diluent.

Use of a mixing vessel as intermediate between mud pot and polymerization reactor is also advantageous for providing flexibility to the preparation of a catalyst slurry. It can be diluted down to a desired concentration just prior to injection into a reactor. The concentration can easily be adjusted to the requirements of the polymerization reactor at any given time.

Preferably, the catalyst slurry in the mixing vessel is stirred. Thereto the mixing vessel is preferably provided with a stirrer. Homogeneity of the slurry can be maintained. This is advantageous for the stability of the reactor conditions in the polymerization reactor receiving said diluted catalyst slurry.

A method of the invention further comprises: increasing the ratio of said diluent to said first ethylene polymerization catalyst in said first catalyst slurry. Increasing the ratio of said diluent to said first ethylene polymerization catalyst can be obtained by increasing the flow rate of diluent sent to a conduit for transporting said catalyst. This step is advantageous as it allows that a first ethylene polymerization catalyst supplied in any given concentration or form can be used in the method. Alternatively the concentration of the first ethylene polymerization catalyst in the mixing vessel may be decreased by adding additional diluent directly to the mixing vessel.

By modifying the rate of diluent used for preparing an ethylene polymerization catalyst slurry, the concentration of catalysts transported in a stream of diluent to a mixing vessel, can be easily modified and adopted. Use of a procedure whereby diluent levels are modified to transfer varying amounts of catalyst is advantageous for optimizing the sequential feeding of at least two ethylene polymerization catalysts to an ethylene polymerization reactor. It allows emptying of mud pots at a constant rate.

A method of the invention may further comprise the step of: emptying the mixing vessel upon reaching a threshold concentration of the first ethylene polymerization catalyst in the mixing vessel. Using a threshold concentration as trigger for emptying the mixing vessel has the advantage that the transition procedure can be kept short. Upon reaching a sufficiently high dilution of the first ethylene polymerization catalyst in said mixing vessel, the mixing vessel is emptied.

In a preferred embodiment, the above mentioned threshold concentration is a catalyst concentration, expressed per weight of diluent in the mixing vessel, of between 0.05 and 2.9 weight percent, more preferably between 0.1 and 0.3 weight percent, most preferably 0.2 weight percent. In a more preferred embodiment, the above mentioned threshold concentration is below 0.2 weight percent catalyst per weight of diluent. This selection provides an ethylene polymerization reactor with a minimal concentration of catalyst for the polymerization of ethylene. Reactor down-time can be kept minimal.

The catalyst may be removed from the diluent and recycled or the ethylene polymerization catalyst and diluent that were removed from the mixing vessel may be treated as waste, for instance burned.

Emptying of the mixing vessel may be achieved by dumping the content to a dumping vessel. In a preferred embodiment, emptying said mixing vessel is performed within a time frame of between 15 minutes to 120 minutes, preferably between 15 to 90 minutes, more preferably between 15 to 60 minutes.

Optionally the mixing vessel is rinsed with fresh diluent. A rinsing step may be beneficial for removing traces of catalyst from the vessel prior to introducing fresh catalyst.

In another step, a method of the invention further comprises: transferring to said mixing vessel a second ethylene polymerization catalyst and a second diluent.

In a preferred embodiment, the second diluent is the same as the first diluent. This is advantageous as only one diluent will need to be removed from polyethylene. In a preferred embodiment of a method according to the invention, the above mentioned first and second diluent is a hydrocarbon diluent, preferably isobutane. Isobutane is compatible with solvents used in an ethylene polymerization process. This is advantageous as removal of the solvent prior to injection of the catalyst into the polymerization reactor is not required. Preferably the method of the invention allows the transitioning between catalysts that are incompatible.

In another step, a method of the invention further comprises removing said first ethylene polymerization catalyst and replacing it by said second ethylene polymerization catalyst in said mixing vessel, thereby providing a second catalyst slurry.

In a preferred embodiment, the first ethylene polymerization catalyst and/or the second ethylene polymerization catalyst is a metallocene catalyst. Metallocene catalysts are presently of great economic importance. Being able to use them in a campaign before and/or after a chromium catalyst or a Ziegler-Natta catalyst, in the same polymerization equipment, using a method providing a time-saving transitioning is highly advantageous.

In a preferred embodiment, either the first ethylene polymerization catalyst and the first diluent or the second ethylene polymerization catalyst and the second diluent are a metallocene catalyst in isobutane. The selection of a metallocene catalyst in isobutane diluent is advantageous as metallocene catalysts mixed with isobutane diluent were found to provide free flowing slurries. They can be easily handled and transported. Isobutane is a relatively cheap solvent. After polymerization of ethylene, isobutane may be removed easily, due to its relatively low boiling point. For the removal of isobutane from polyethylene, isobutane flushing means may be used.

In another step, a method of the invention further comprises decreasing the ratio of said second diluent to said second ethylene polymerization catalyst in said mixing vessel. Decreasing the ratio of the second diluent to the second ethylene polymerization catalyst can be obtained by decreasing the flow rate of diluent sent to a conduit for transporting the second ethylene polymerization catalyst. This step is advantageous as it allows that a second ethylene polymerization catalyst supplied in any given concentration or form can be used in the method.

In a preferred embodiment, the first diluent is the same as the second diluent. In a more preferred embodiment, the first and second diluent is isobutane.

In a preferred embodiment, the first and/or the second diluent is injected into a conduit for transferring the first ethylene polymerization catalyst and/or the second ethylene polymerization catalyst to the mixing vessel.

In a preferred embodiment, the method of the invention further comprises the step of rinsing a conduit transferring said first ethylene polymerization catalyst to said mixing vessel with diluent. Rinsing conduits with diluent avoids the settling of catalyst particles in the conduits. This is economically more efficient. It is also safer as it avoids exposure of remaining catalyst particles to air upon opening of the conduits for inspection or repairs.

In another step, a method of the invention further comprises: sequentially transferring the first and second ethylene polymerization catalyst slurry from said mixing vessel to the ethylene polymerization reactor thereby providing the first or second ethylene polymerization catalyst at a concentration suitable for polymerizing ethylene.

Diluted catalyst slurry is withdrawn from the mixing vessel through one or more conduits and provided through these conduits to a polymerization reactor. Each conduit is provided with a pumping means, which controls the transfer and injection of the catalyst slurry into the reactors. In a preferred embodiment, said pumping means are membrane pumps. Using membrane pumps for transferring a catalyst slurry to a polymerization reactor is advantageous as it allows use of a pressure difference between catalyst slurry vessel and the polymerization reactor. Installation of a lower pressure in the catalyst slurry vessel compared to the polymerization reactor will avoid that catalyst slurry is transferred unnecessary and/or in an uncontrolled manner to the polymerization reactor. This provides a safety means for avoiding run-away reactions in the polymerization reactor.

Preferably, there is continuous flushing of the conduit downstream the membrane pump to the reactor by means of diluent flushing means, preferably isobutane flushing means. The conduit upstream the pump may be flushed discontinuously, by means of isobutane flushing means. Different conduits may be provided for connecting the mixing vessel to the reactor.

The conduits are further provided with diluent flushing means, preferably isobutane flushing means, either at the inlet, at the outlet or at both sides of the membrane pumps. Isobutane flushing means enable to flush isobutane through the conduit and to keep the conduits and the pumping means unplugged.

The present invention is applicable to any slurry polymerization in a liquid medium. The invention is particularly applicable to olefin polymerizations in a liquid diluent in which the resulting polymer is mostly insoluble under polymerization conditions. Most particularly the invention is applicable to any olefin polymerization utilizing a diluent so as to produce a slurry of polymer solids and liquid diluent. Suitable olefin monomers are 1-olefins having up to 8 carbon atoms per molecule and no branching nearer the double bond than the 4-position.

In a preferred embodiment of the invention, the above mentioned catalyst slurry is transferred to an ethylene polymerization reactor. In a preferred embodiment of the invention, the above mentioned catalyst slurry is transferred to an ethylene co-polymerization reactor.

The invention is particularly suitable for the copolymerization of ethylene and a higher 1-olefin such as 1-butene, 1-pentene, 1-hexene, 1-octene and 1-decene. For example, copolymers can be made from ethylene and 0.01 to 10 weight percent, alternatively 0.01 to 5 weight percent, alternatively 0.1 to 4 weight percent higher olefin based on the total weight of ethylene and co-monomer. Alternatively sufficient co-monomer can be used to give the above-described amounts of co-monomer incorporation in the polymer. Suitable diluents for use as the liquid medium in a loop reactor are well known in the art and include hydrocarbons, which are inert and liquid under reaction conditions. Suitable hydrocarbons include isobutane, propane, n-pentane, i-pentane, neopentane and n-hexane, with isobutane being especially preferred.

In a preferred embodiment, sequentially transferring the first ethylene polymerization catalyst and the second ethylene polymerization catalyst is providing the ethylene polymerization reactor, preferably a double loop reactor, with a catalyst concentration suitable for the production of polyethylene, preferably bimodal polyethylene, when producing the polyethylene.

The present invention is particularly applicable to any ethylene polymerization reaction in a loop reactor. A so-called loop reactor is well known and is described in the Encyclopaedia of Chemical Technology, 3rd edition, vol. 16 page 390. Additional details regarding loop reactor apparatus and polymerization processes may be found in US 2009/0143546. A loop reactor consist of a long pipe, arranged in one or more, typically two loops, each loop being tens of meters high. The diameter of the pipes is typically around 60 cm. Such an arrangement has a large surface area:volume ratio as compared with a conventional flask or vessel arrangement. This ensures that there is sufficient surface area to the reaction vessel to allow heat exchange with the outer environment, thus reducing the temperature inside the reactor. This makes it particularly suitable for polymerization reactions which are exothermic and require extensive cooling. The configuration is also advantageous as it provides a lot of room for the installation of a cooling system, usually water jackets. This serves to efficiently carry away heat from the surface of the reactor, to increase the efficiency of cooling.

Loop reactors may be connected in parallel or in series. The present invention is particularly applicable to a pair of loop reactors connected in series. When the two reactors are connected in series, different reaction conditions can be used in the reactors allowing the production of several types of products using the same installation. Bimodal polymers may be produced by producing a high molecular weight polymer fraction in a first loop reactor and a low molecular weight polymer fraction in a second loop reactor.

In a preferred embodiment, the method of the invention further comprises the step of substantially freeing said ethylene polymerization reactor from said first ethylene polymerization catalyst prior to feeding said reactor with said second ethylene polymerization catalyst. Freeing an ethylene polymerization reactor from catalyst may be achieved by stopping the polymerization reaction, rinsing the reactor with diluent and restarting.

In case traces of inactivated catalysts remain in the ethylene polymerization reactor, the polymerization reaction may have decreased efficiency and yield polymer resins of less quality and of undesired properties. Preferably the rinsing step comprises adding a killing agent to the ethylene polymerization reactor. In a preferred embodiment, the method of the invention further comprises the step of comprising the step of: adding a killing agent to the ethylene polymerization reactor for removing the first ethylene polymerization catalyst from the above mentioned reactor.

As used herein the term "killing agent" refers to a "catalyst inactivation agent" for the inactivation or deactivation of a catalyst, preferably a metallocene, Ziegler-Natta or chromium catalyst. The terms killing, deactivating or inactivating refer to the action of eliminating the catalytic activity of the catalyst. The use of the catalyst inactivation agent in the method of the present invention provides the opportunity to remove any traces of catalyst remaining in the ethylene polymerization reactor.

The catalyst inactivation agent according to the present invention is preferably an "aqueous" catalyst inactivation agent, whereby "aqueous" refers to the fact that the inactivation agent (composition) contains at least 10% by weight of water. In an embodiment, the invention provides a method wherein said aqueous catalyst inactivation agent consists of water.

In an embodiment, the method according to the present invention provides that said aqueous catalyst inactivation agent comprises at least 10% by weight of water, preferably said aqueous catalyst inactivation agent comprises at least 20%, 30%, 40%, 50%, 60%, 70%, 80%, 90% or 100% by weight of water. As the amount of water in said aqueous catalyst inactivation agent increases, the rate at which catalyst is deactivated increases. Higher amounts of water in said aqueous catalyst inactivation agent therefore provide higher catalyst deactivation rates. On the other hand, an aqueous catalyst inactivation agent with a small amount of water provides very high rates by which the aqueous catalyst inactivation agent as such can be removed from the catalyst slurry preparation system, without leaving significant traces of said aqueous catalyst inactivation agent. In accordance with the invention the amount of water in said aqueous catalyst inactivation agent preferably ranges between 10% and 90%, preferably between 25% and 75%, and more preferably between 45% and 55% by weight of the composition. Such compositions provide a good equilibrium between a fast removal of the aqueous catalyst inactivation agent and a fast deactivation of the catalyst present in the catalyst slurry preparation system. Said aqueous catalyst inactivation agent is particularly suitable for inactivating metallocene and Ziegler-Natta catalysts.

In a preferred embodiment said aqueous catalyst inactivation agent comprises an anti-freezing agent such as an alcohol. Said alcohol refers to an organic compound in which a hydroxyl group is bound to a carbon atom of an alkyl or substituted alkyl group such as for instance, but not limited to methanol, ethanol, propanol, butanol, isopropanol and/or tert-butyl alcohol. The addition of an alcohol to said aqueous catalyst inactivation agent permits to lower the freezing temperature of the agent, allowing the agent to remain in a liquid form under low temperature conditions. The aqueous catalyst inactivation agent will therefore not freeze at temperatures below 0° C., allowing the preparation system to remain operational at extremely low temperatures.

In a preferred embodiment, said aqueous catalyst inactivation agent comprises at least 10% by weight of alcohol, preferably at least 20%, 30%, 40%, 50%, 60%, 70%, 80% or 90% by weight of alcohol. In a preferred embodiment, the alcohol is isopropanol. In an example, said aqueous catalyst inactivation agent is a mixture of 50 weight % isopropanol and 50 weight % water. In another example, said aqueous catalyst inactivation agent is a mixture of 90 weight % water and no more than 10 weight % isopropanol. In a preferred embodiment, the above mentioned killing agent comprises water, optionally comprising up to 50 weight % isopropanol. Use of an alcohol in the rinsing step is advantageous as it provides anti-freezing properties. This may be beneficial for cleaning a reactor in winter.

In another preferred embodiment, said catalyst inactivation agent is oxygen. Oxygen is particularly suitable for inactivating a chromium catalyst.

In another preferred embodiment, said catalyst inactivation agent is carbon monoxide (CO). Carbon monoxide is particularly suitable for inactivating metallocene and Ziegler-Natta catalysts.

In a preferred embodiment, said catalyst inactivation agent is selected from a list consisting of water, carbon monoxide and oxygen.

In a preferred embodiment, a method according to the invention further comprises the step of transferring the first ethylene polymerization catalyst or the second ethylene polymerization catalyst from the mixing vessel to the ethylene polymerization reactor at a flow rate adjusted to the ethylene in the reactor. It is advantageous to match the amount of catalyst fed to a polymerization reactor to the amount of reactants, here ethylene, present in a reactor. This is economically advantageous as excess ethylene is avoided. Run-away conditions are avoided. A polymerization reactor can be kept in steady-state operating condition.

By the term "steady-state condition" it is meant that the polymerization reaction can be kept in a stable condition that does not change over time or in which change in one direction is continually balanced by change in another. In this invention, it means in particular that the polymerization reaction exhibits only negligible change.

Preferably a method according to the invention further comprises the step of lowering ethylene in the ethylene polymerization reactor prior to progressively replacing the first ethylene polymerization catalyst by the second ethylene polymerization catalyst. In case the second polymerization catalyst is more active, a replacement of catalyst will not lead to an increase in reactivity as the raw material level was lowered. The step of lowering ethylene prior to feeding a catalyst with another polymerization catalyst is a safety precaution. In a preferred embodiment, the method of the invention further comprises the step of progressively decreasing ethylene supply to said ethylene polymerization reactor.

In a preferred embodiment the ethylene is lowered by at least two percent, preferably at least 5 percent, more preferably at most 10 percent. Having to lower the ethylene feed to a polymerization reactor by only a small increment, has for advantage that the reaction conditions are barely changed. This is advantageous for maintaining steady-state conditions in the reactor.

In a preferred embodiment, a method according to the invention further comprises the step of lowering hydrogen and/or co-monomer in the ethylene polymerization reactor. This is advantageous as excess reactants are avoided; hence waste streams are reduced to a minimum.

In a preferred embodiment, a method according to the invention further comprises the step of intermittently adding ethylene to the reactor before the second ethylene polymerization catalyst slurry is introduced to said polymerization reactor. This step allows to slowly start filling the reactor and slowly get the reaction starting.

A method according to an embodiment of the invention is advantageous as it allows for a very fast transitioning between incompatible catalysts and reduces reactor down-time to a minimum. The benefit of this procedure is that the switching over from one catalyst to another is not executed in the reactor itself. Execution of the transition procedure in a small volume vessel compared to a large volume reactor, further has the advantage that the method can be monitored and controlled better. Another benefit is that wastes are reduced.

In a second aspect the invention provides a use in an ethylene polymerization reactor plant of a method of the invention as previously described for the sequential use of at least two ethylene polymerization catalysts.

In a preferred embodiment of the above described use, the above mentioned first and second ethylene polymerization catalyst are not of the same type and/or are incompatible and/or have a different H2 response and generate polymers that do not blend into each other. In a preferred embodiment of the above described use, the first ethylene polymerization catalyst is a Ziegler-Natta catalyst, Chromium catalyst or a metallocene catalyst. In a preferred embodiment of the above described use, the second ethylene polymerization catalyst is a Ziegler-Natta catalyst, Chromium catalyst or a metallocene catalyst.

In a preferred embodiment of the above described use, the above described second ethylene polymerization catalyst is for producing in said ethylene polymerization reactor a polyethylene with a melt flow index smaller than for a polyethylene obtained in the above described ethylene polymerization reactor with above described ethylene polymerization catalyst.

In a preferred embodiment of the above described use, rinsing said mixing vessel with fresh diluent is abandoned. Being able to skip a rinsing step is advantageous as it further reduces the time required to transition between catalysts. A rinsing step can for instance be abandoned when the polymers resulting from production with different catalysts have a melt flow index which is sufficiently similar in that the polymers are miscible.

EXAMPLES

Figure 1:
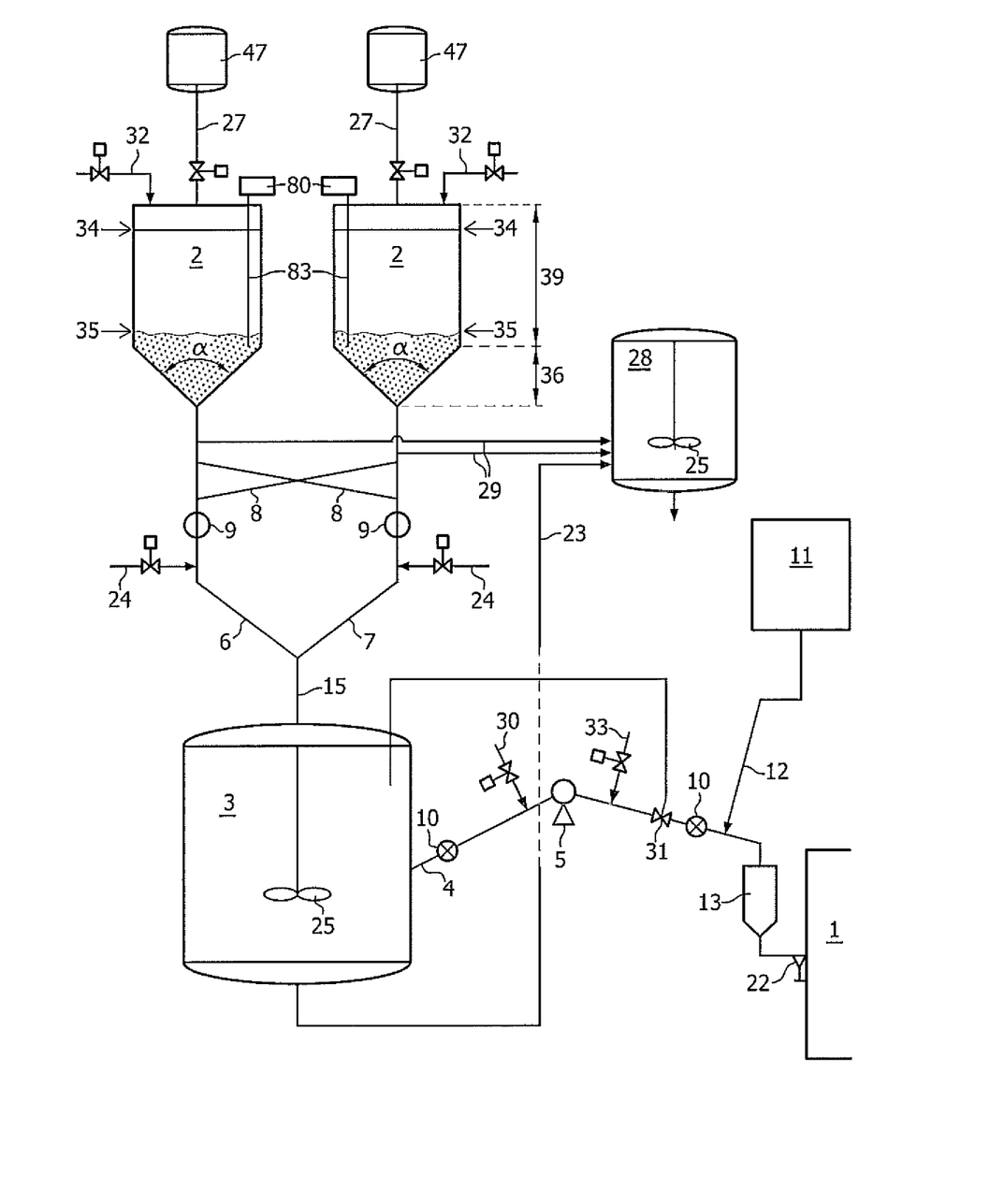
FIG. 1 schematically illustrates an embodiment of a catalyst slurry preparation system suitable for preparing catalyst slurries comprising incompatible catalysts and sequentially feeding these catalyst slurries to an ethylene polymerization reactor.

The above aspects and embodiments are further supported by the following non-limiting examples as illustrated by FIG. 1.

Example 1

This example describes the transition from a chromium-based catalyst to a metallocene catalyst in the polymerization of ethylene.

A first mud pot capable of holding 300 kg of catalyst was loaded with chromium-based catalyst. Commercially available catalyst was used. The catalyst was fed to a mixing vessel in form of a slurry. The slurry was prepared by mixing the chromium catalyst from the mud pot with isobutane. A polymerization was performed in a double loop ethylene polymerization reactor. The polymerization reaction ran using chromium-based catalyst for a period of 1 day.

Flow rate of isobutane was increased, thereby diluting the chromium catalyst concentration in the conduit connecting the mud pot to the mixing vessel. Upon reaching a desired concentration of chromium catalyst in the mixing vessel, the content of the mixing vessel was emptied into a dumping vessel.

The ethylene feed to the reactor was stopped. The reactor was emptied and rinsed with water comprising isopropanol. The reactor was filled back up with ethylene and diluent.

A second mud pot was loaded with a metallocene catalyst. Commercially available catalyst was used. The catalyst was fed to the mixing vessel in the form of a slurry. The second catalyst slurry was prepared by mixing the metallocene catalyst from the second mud pot with isobutane.

The second catalyst slurry was fed to the polymerization reactor. The polymerization reaction was restarted.

Example 2

The hereunder-described device, illustrated by FIG. 1, corresponds to equipment suitable for carrying out the method of the invention. Example 2 will illustrate the use of a method of the invention for the sequential feeding of at least two incompatible ethylene polymerization catalysts in an ethylene polymerization reactor plant.

A metallocene catalyst is solid and is generally provided under a dry form in commercially available packaging.

Depending on the diluent used, it may be required to bring the catalyst under higher pressure conditions. This is for instance the case when isobutane is used, since this diluent is only liquid at higher pressure levels. In case for instance hexane is used as diluent, pressurization is not required, since this diluent is liquid at low pressures.

Preferably pressurizeable catalyst supply containers are used. Pressurizeable containers may be suitable for direct use and coupling to an inlet provided on the mud pot. Use of a larger size pressurizeable container for transportation and supply is therefore preferred. The pressurizeable catalyst supply vessel 47 is preferably suitable for handling pressure levels of between 1.1 and 16 barg, preferably around 10 barg. Purging in such catalyst supply vessel 47 is preferably performed by means of nitrogen and venting to a flare (not illustrated).

Preferably, a metallocene catalyst is provided directly from the container 47 in which it was transported to a mud pot 2. In a preferred embodiment, the catalyst can be off-loaded from the container by applying a gravitational force. In other means an outlet opening is provided on said container at the bottom of said container which is suitable for connecting to the inlet opening on said mud pot. Catalyst from the vessel 47 is transferred by means of conduit 27 to a mud pot 2.

Catalyst slurry is prepared in a mud pot 2. The catalyst slurry comprises solid catalyst in a hydrocarbon diluent. When using a metallocene catalyst, hydrocarbons such as hexane or isobutane can be used to dilute the catalyst and to obtain a catalyst slurry. However, a major disadvantage of using hexane as diluent to prepare the catalyst is that a portion of hexane generally ends up in the final polymer product, which is undesirable. Isobutane on the other hand is easier to handle, to purify and to re-use in the polymerization process than hexane. For instance, since in the polymerization process of ethylene, isobutane is applied as diluent in the reaction, isobutane used as diluent for the catalyst can easily be re-used in the polymerization process. Therefore, in a preferred embodiment, isobutane is used as diluent for the metallocene catalyst. In a particularly preferred embodiment, pure isobutane is used to prepare the catalyst. Isobutane is generally present in gaseous form at a temperature of about 20° C. and at atmospheric pressure. In other to obtain liquid isobutane for preparing the catalyst slurry, increased pressures need to be obtained. Therefore, the solid catalyst particles are provided to a mud pot 2, and later on to a mixing vessel 3, wherein in said mixing vessel an increased pressure, preferably comprised between 2 barg and 16 barg, and more preferably between 3 and 7 barg, and most preferably of 5 barg can be applied.

Still referring to FIG. 1, the transfer of the metallocene catalyst from the catalyst supply vessel 47 to the mud pot 2 is preferably done by gravity. Before transferring the metallocene catalyst from the catalyst supply vessel 47 to the mud pot 2, isobutane is admitted into the mud pot 2. The mud pot 2 is provided with an inlet 32 for supply of this diluent. The diluent is filled in the mud pot 2, and the catalyst supply vessel 47 is emptied. To avoid catalyst remains in the catalyst supply vessel 47, the vessel is flushed with isobutane, such that remaining catalyst is transferred to the mud pot 2. The mud pot 2 is not agitated by means of stirring or mixing means to allow the metallocene catalyst to settle. Preparing concentrated catalyst slurry in this way advantageously enables the use of small sized mud pots keeping investment expenditures limited.

After sedimented metallocene catalyst slurry has been prepared in the mud pot 2, the catalyst slurry is transferred from the mud pot 2 to the mixing vessel 3. The transfer can take place manually or automatically. Preferably the transfer of catalyst slurry from the mud pot 2 to the mixing vessel 3 is performed by means of conduits 6, 7, 15 controlled by transfer means. Said transfer means preferably comprise a metering valve 9.

Preferably in the mixing vessel, a catalyst slurry comprising solid catalyst in a hydrocarbon diluent is prepared having a concentration comprised between 0.1 and 10% by weight, and even more preferred having a concentration comprised between 0.5 and 5% by weight, and even more preferred between 1 and 3% by weight.

The amount of catalyst slurry in the mixing vessel 3 is kept at a substantially constant level by transferring catalyst slurry prepared in the mud pot 2 to the mixing vessel 3, once the amount of catalyst slurry in the mixing vessel 3 goes below a certain level. The mixing vessel is preferably kept liquid-full.

The conduits 6, 7 are interconnected by means of connecting lines 8. Such lines 8 enable that the different mud pots 2 can be used in accordance with all provided conduits 6, 7. For instance, as represented in FIG. 1, in case two mud pots 2 are provided, each having a conduit 6 or 7, the conduit 6 for transferring said catalyst from a first mud pot 2 to a mixing vessel 3 is interchangeable with a second conduit 7 for transferring said catalyst from a second mud pot 2 to a mixing vessel 3 through lines 8 connecting said first 6 with said second 7 conduit. Such interconnection permits, in case of interruption of catalyst transfer through one conduit 6, to discharge the catalyst to the mixing vessel 13 through a second conduit 7.

The amount of diluent in the mud pot 2 is kept substantially constant, i.e. above a certain level and between certain suitable ranges. The level of diluent in the mud pot 2 is substantially constant between 40 and 100% of the vessel volume, and more preferred between 60 and 95%, and even more preferred between 80 and 90%.

The catalyst slurry level in the mud pot 2 is determined by measuring the position of the level of diluent in the mud pot 2, for instance using a Time Domain Reflectometer 80, provided with guiding means 83. By means of this device the level of diluent 34 as well as the level of the interface formed between diluent and sedimented catalyst slurry 35 may be measured. Preferably the mud pot 2 has a cylindrical body 39 and a frustoconical bottom portion 36 with an opening angle α. This geometry is advantageous for enhancing the sedimentation of solid catalyst in the liquid diluent.

The mud pot 2 is preferably large enough to contain sufficient catalyst slurry and large enough such that a day vessel capacity is equivalent to the time to prepare a new batch. This enables to assure the continuous production and availability of the catalyst in the polymerization reaction. In addition, in another preferred embodiment, the pressure in the mud pot 2 is preferably maintained between 4 and 16 barg, preferably between 7 barg and 11 berg, most preferably at 9 barg.

Still referring to FIG. 1, the metallocene catalyst slurry is subsequently transferred from the mixing vessel 3 to the ethylene polymerization reactor 1 through one or more conduits 4. The conduits 4 preferably have a diameter comprised between 0.3 and 2 cm, and preferably between 0.6 and 1 cm. Each conduit 4 is provided with a pumping means 5, which controls the transfer and injection of the catalyst slurry into the ethylene polymerization reactor 1. Preferably said pumping means are diaphragm pumps. Preferably, said reactor is a double loop reactor with two loop reactors are connected in series.

Still referring to FIG. 1, the supply of diluent from conduit 24 to conduit 6 is increased, decreasing the concentration of metallocene catalyst transported to the mixing vessel 3 and to the polymerization reactor 1.

The supply of diluent from conduit 24 to conduit 6 is increased. Catalyst concentration in the mixing vessel is lowered to 0.3 weight %. Supply of catalyst slurry to the mixing vessel is stopped. Supply of a catalyst slurry to ethylene polymerization reactor 1 is stopped. The content of the mixing vessel is transferred to a dump vessel 28.

This catalyst waste can be sent through a conduit 29, 23, which is provided with a control valve, to one or more dump vessels 28. The mud pot 2 and the mixing vessel 3 can be emptied in a common or in separate dump vessels. Preferably a dumping vessel 28 is provided with a stirrer 25. Preferably said dump vessel 28 are larger than the mud pot 2 and the mixing vessel 3. The dump vessel 28 is preferably a heated vessel, having a steam jacket, where the diluent, i.e. isobutane, is evaporated. The steam jacket is preferred, for desorbing isobutane from the solid catalyst. The evaporated diluent is sent to a distillation unit or to a flare. In order to avoid the transfer of catalyst fragments when transferring the evaporated diluent, guard filters are provided with the dump vessels. The dump vessels are also provided with pressure controlling means for controlling the pressure in said vessels. The catalyst waste remaining after evaporation of the diluent is removed from the vessels, preferably by means of a draining system, provided at the bottom of the vessel, and the removed waste is discharged into drums and destroyed.

The loop reactors of the ethylene polymerization loop reactor are injected with a killing agent. The killing agent deactivates the catalyst present in the reactor. The reactor is made solids free. Polymerization product is continuously removed from the reactor, thereby also removing catalyst. The diluent remains in the reactor. As it is circulated and permanently refreshed, the concentration of killing agent in the reactor declines. A reactor free of solids is ready for restarting a polymerization reaction. Typically a cycle for deactivating of catalyst and making a reactor solids free and ready for polymerization again, takes about 8 hours A second mud pot 2, loaded with a chromium-based catalyst is connected by means of conduit 7 to mixing vessel 3.

Chromium-based catalyst is transferred from the mud pot 2 to the mixing vessel 3. The supply of diluent from conduit 24 to conduit 6 is decreased, thereby increasing the flow rate of chromium-based catalyst to the mixing vessel 3.

Supply of a catalyst slurry to ethylene polymerization reactor 1 is restored. A suitable concentration for use in an ethylene polymerization reaction is preferably comprised between 0.1% and 10%, more preferably comprised between 0.5% and 5%, most preferably between 1% and 3%, expressed in catalyst weight by weight of diluent.

The conduits 4 are further provided with isobutane flushing means, either at the inlet 30, at the outlet 33 or at both sides of the membrane pumps 5, as illustrated on FIG. 1. isobutane flushing means 30, 33 enable to flush isobutane through the conduit 4 and to keep the conduits 4 and the pumping means 5 unplugged. Preferably, there is continuous flushing of the conduit 4 downstream the membrane pump 5 to the reactor 1 by means of isobutane flushing means 33. The conduit 4 upstream the pump 5 may be flushed discontinuously, by means of isobutane flushing means 30. When different conduits 4 are provided for connecting the mixing vessel 3 to the reactor 1, generally, one conduit having one active pumping means 5 will be operative, while the other conduits 4 and pumping means 5 will not be operative but will be kept in stand by mode. In this latter case, the conduit 4 downstream the pump 5 will preferably be flushed with a suitable stream of diluent. The conduit 4 upstream the pump 5 may be discontinuously flushed. In addition, two-way valves 31 can be installed on the conduits 4, in order to never stop the pumping means 5.

It is important to correctly control the catalyst flow rate to the reactor and to pump catalyst slurry into the reactor at a controlled and limited flow rate. An unexpected flow rate to the reactor could lead to a runaway reaction. A fluctuating flow to the reactor could lead to reduced efficiency and fluctuations in product quality. Therefore, in a particularly preferred embodiment, the injection pump 5 flow rates are controlled by the reactor 1 activity.

The pumping means are in particular controllable in function of the concentration of a reactant in said reactor. Preferably said reactant is the concentration of monomer, i.e. ethylene, in the reactor. However, it should be clear that the membrane pumps are controllable in function of the concentration of other reactants, such as e.g. the co-monomer or hydrogen concentrations in the reactor as well. By the use of membrane pumps 5 the invention provides for a good control catalyst flow. In particular, the catalyst flow rate to the reactors is controlled by adjusting the stroke and/or frequency of the membrane pumps.

Furthermore, the pump flow rates are controlled by the ethylene concentration in the reactor. In case the ethylene concentration is high in the reactor, more catalyst will be added to the reactor and vice versa. In this way, the variations in ethylene polymerization rate are taken into account and actual production rate and product properties do not fluctuate significantly. Variations in ethylene polymerization rate are taken into account and polymerization reactions under optimal catalyst feeding conditions can be obtained.

The catalyst transition system may be further provided with a activating agent distribution system, for bringing a suitable amount of activating agent into contact with the catalyst slurry for a suitable period of time before supplying said catalyst slurry to said reactor. When using a metallocene catalyst, tri isobutyl aluminium (TIBAL) is preferably used as activating agent. When using a Ziegler-Natta catalyst, tri isobutyl aluminium (TIDAL) is preferably used as activating agent.

Activating agent wastes can be sent to a dump vessel 28, which is preferably provided with stirring means 25 and contains mineral oil for neutralization and elimination. The dump is provided with a heated vessel, e.g. steam jacket, where the isobutane is evaporated and sent to distillation or to the flare.

Activating agents are generally provided in commercial drums. In a storage vessel of the activating agent distribution system 11, the TIBAL activating agent is generally provided in a solution of hexane or heptane, but can be provided in pure form too. The TIBAL activating agent is transferred from the storage vessel through a activating agent injection conduit 12, in the conduit 4, which connects the mixing vessel 3 with the reactor 1. Conduit 12 intersects conduit 4, downstream the diaphragm pumps 5 and upstream the reactor 1. In case a flow measuring means 10 is further provided on the conduits 4, the activating agent feeding conduit 12 preferably intersects the conduit 4, downstream of said flow meter 10 and upstream the reactor 1.

In case the TIBAL activating agent is injected in the conduit 4, the injection point is at a distance from the reactor allowing a certain pre-contact time with the catalyst before being supplied to the reactor. In order to have a sufficient pre-contact time, preferably between 5 seconds and 1 minute, between the metallocene catalyst slurry and the TIBAL activating agent, each conduit 4 is provided with a contact vessel 13, preferably downstream the injection point of the co-catalyst distribution system, for enhancing the contact time of said activating agent with said catalyst slurry in the conduits 4. These contact vessels 13 can be agitated or not. In another preferred embodiment, the conduits 4 have an inner diameter comprised between 0.3 and 2 cm, and preferably comprised between 0.6 and 1 cm while the diameter of the contact vessels 13 is preferably comprised between 1 and 15 cm and preferably between 6 and 9 cm.

The catalyst slurry is injected under controlled flow rate into the reactor. The conduits 4 for transferring catalyst slurry into to the reactor are equipped by one or more valves, preferably piston valves 22. The piston valves 22 are capable of sealing the orifice by which the conduit 4 is connected to the reactor 1. When using different conduits 4 for transferring catalyst slurry to one reactor, only in one conduit 4 the pumps actively pump catalyst slurry to the reactor, while in other conduits 4 the pumps are not active and the conduits are preferably flushed by isobutane.

Example 3

Transition of Non-Compatible Catalysts

1. A first polyethylene is produced using a Cr-based catalyst under normal operating conditions in a polymerization slurry loop reactor with an ethylene off-gas concentration of 8 wt %. The catalyst slurry in the mixing vessel had a concentration of 3 wt %.
The transfer from the Cr-based catalyst to the metallocene catalyst is performed as follows:
2. The isobutane diluent to the mixing vessel having a volume of 500 L is increased gradually from 70 to 150 kg/hr over a period of 2 hours.
3. The ethylene feed is kept constant during the transition to reduce the ethylene off-gas of the polymerization slurry loop reactor.
4. When an ethylene off-gas of 3 wt % is obtained, the Cr catalyst supply to the mixing vessel is stopped.
5. The ethylene feed to the polymerization reactor is stopped simultaneously.
6. The polymer product and catalyst slurry which circulate in the loop reactor are removed over a period of 6 hours.
7. The contents of the mixing vessel are emptied towards the catalyst dump tank (28)
8. The mixing vessel is washed with 500 L of water and then emptied towards the catalyst dump tank by gravity.
9. 5 cycles of pressurizing using nitrogen (up to 10 bar) and relieving the pressure from the mixing vessel via the bottom valve to the dump tank to remove all traces of free water.
10. The mixing vessel is filled with isobutane diluent again.
11. The polymerization reactor was resaturated with alkyl aluminium cocatalyst and the ethylene feed is started again in order to obtain a 3 wt % of ethylene off-gas. This ethylene feed is an intermittent feed to slowly start filling the reactor and slowly get the reaction starting.
12. From the second catalyst mudpot, metallocene catalyst is fed to the mixing vessel, and continuously fed from the mixing vessel to the polymerization reactor.
13. Simultaneously, the isobutane diluent feed rate to the mixing vessel is set at a reduced rate of 30 kg/hr, which is increased to 70 kg/hr once the nominal concentration of 1.5 wt % of catalyst in the slurry is reached in the mixing vessel.
14. After 30 minutes of catalyst feeding into the reactor at a controlled ethylene off gas concentration of 3 wt %, a production rate of 2 t/hr is reached.
15. The capacity is then increased to nominal capacity of the reactor, with an off-gas concentration of 8 wt %.
The transition is effected from the moment the Cr-based catalyst polymerization is stopped to the moment the new production rate of 2 t/hr with the metallocene catalyst polymerization over a period of 15 hours. The principle supply of ethylene in continuous, net form into the reactor occurs after catalyst addition has been started i.e. step 14, when the supply of ethylene is restored to its nominal capacity.

What is claimed is:

1. A method for optimizing sequential use of at least two ethylene polymerization catalysts in an ethylene polymerization loop reactor, comprising:
transferring to a mixing vessel a first ethylene polymerization catalyst and a first diluent, thereby providing a first catalyst slurry,
transferring said first catalyst slurry from said mixing vessel to an ethylene polymerization loop reactor at a concentration suitable for polymerizing ethylene,
increasing a ratio of said first diluent to said first ethylene polymerization catalyst in said first catalyst slurry,
stopping a supply of said first catalyst slurry to said mixing vessel,
stopping a supply of said first catalyst slurry to said ethylene polymerization loop reactor,
stopping a supply of ethylene to said ethylene polymerization loop reactor,
removing said first catalyst slurry from said ethylene polymerization loop reactor,
emptying said mixing vessel,
optionally rinsing said mixing vessel with fresh diluent,
transferring to said mixing vessel a second ethylene polymerization catalyst and a second diluent, thereby providing a second catalyst slurry,
decreasing a ratio of said second diluent to said second ethylene polymerization catalyst in said mixing vessel to obtain a concentration of said second ethylene polymerization catalyst in said second diluent suitable for polymerizing ethylene,
transferring said second ethylene polymerization catalyst slurry from said mixing vessel to said ethylene polymerization loop reactor,
restoring the supply of ethylene to said ethylene polymerization loop reactor,
restarting ethylene polymerization in said ethylene polymerization loop reactor.

2. The method according to claim 1, wherein emptying said mixing vessel is performed within a time frame of between 15 minutes to 120 minutes.

3. The method according to claim 2, wherein said mixing vessel has a capacity of 500 l of diluent.

4. The method according to claim 1, wherein said first ethylene polymerization catalyst and/or said second ethylene polymerization catalyst is a metallocene catalyst.

5. The method according to claim 1, wherein said diluent is isobutane.

6. The method according to claim 1, further comprising the step of rinsing a conduit transferring said first ethylene polymerization catalyst to said mixing vessel with diluent.

7. The method according to claim 1, further comprising the step of: substantially freeing said ethylene polymerization loop reactor from said first ethylene polymerization catalyst prior to feeding said ethylene polymerization loop reactor with said second ethylene polymerization catalyst.

8. The method according to claim 7, further comprising the step of: adding a killing agent to said ethylene polymerization loop reactor for removing said first ethylene polymerization catalyst from said ethylene polymerization loop reactor.

9. The method according to claim 8, wherein said killing agent is selected from a group consisting of water, carbon monoxide and oxygen.

10. The method according to claim 1, further comprising the step of progressively decreasing ethylene supply to said ethylene polymerization loop reactor.

11. The method according to claim 1, further comprising the step of intermittently adding ethylene to the ethylene polymerization loop reactor before the second ethylene polymerization catalyst slurry is introduced to said ethylene polymerization loop reactor.

12. The method according to claim 1, wherein said first ethylene polymerization catalyst is a Ziegler-Natta catalyst, chromium catalyst or a metallocene catalyst.

13. The method according to claim 1, wherein said second ethylene polymerization catalyst is a Ziegler-Natta catalyst, chromium catalyst or a metallocene catalyst.

14. The method according to claim 1, wherein said first and said second ethylene polymerization catalysts are incompatible.

15. The method according to claim 1, wherein said second ethylene polymerization catalyst is for producing in said ethylene polymerization loop reactor a polyethylene with a melt flow index smaller than for a polyethylene obtained in said ethylene polymerization loop reactor with said first ethylene polymerization catalyst.

16. The method according to claim 1, wherein rinsing said mixing vessel with fresh diluent is abandoned.

* * * * *